United States Patent
Kawanami

(10) Patent No.: US 8,134,629 B2
(45) Date of Patent: Mar. 13, 2012

(54) IMAGE SENSOR DRIVING UNIT AND CAMERA

(75) Inventor: Naoto Kawanami, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 349 days.

(21) Appl. No.: 12/571,697

(22) Filed: Oct. 1, 2009

(65) Prior Publication Data

US 2010/0091165 A1 Apr. 15, 2010

(30) Foreign Application Priority Data

Oct. 15, 2008 (JP) ................................ 2008-266756

(51) Int. Cl.
*H04N 5/335* (2006.01)

(52) U.S. Cl. ........ 348/312; 348/314; 348/320; 348/296; 348/297; 348/298

(58) Field of Classification Search .......... 348/302–311, 348/312, 314, 296, 297, 298, 320
See application file for complete search history.

(56) References Cited

U.S. PATENT DOCUMENTS

| | | | | |
|---|---|---|---|---|
| 5,463,421 A | * | 10/1995 | Deguchi et al. ............... | 348/296 |
| 7,499,080 B2 | * | 3/2009 | Hattori et al. ............. | 348/220.1 |
| 2006/0115260 A1 | | 6/2006 | Nomura | |
| 2009/0149705 A1 | | 6/2009 | Tani et al. | |
| 2009/0231709 A1 | | 9/2009 | Nomura et al. | |
| 2010/0066885 A1 | * | 3/2010 | Kawanami ................... | 348/311 |
| 2010/0066887 A1 | * | 3/2010 | Kawanami ................... | 348/311 |

FOREIGN PATENT DOCUMENTS

| | | |
|---|---|---|
| JP | 4-356879 | 12/1992 |
| JP | 06121235 A * | 4/1994 |

OTHER PUBLICATIONS

English language Abstract of JP 4-356879, Dec. 10, 1992.
U.S. Appl. No. 12/546,931 to Kawanami, filed Aug. 25, 2009.
U.S. Appl. No. 12/558,644 to Kawanami, filed Sep. 14, 2009.

* cited by examiner

*Primary Examiner* — Lin Ye
*Assistant Examiner* — Marly Camargo
(74) *Attorney, Agent, or Firm* — Greenblum & Bernstein, P.L.C.

(57) ABSTRACT

An image sensor driving unit, comprising a signal generator and a controller, is provided. The charge-transfer channel transfers the signal charges at a speed according to the frequency of a transfer signal. The signal generator transmits the first discharge signal and the second discharge signal to the image sensor. The first and second discharge signals are the transfer signals for the charge-transfer channel to carry out rapid discharge. The frequency of the second discharge signal is greater than that of the first discharge signal. The controller orders the signal generator to generate the first discharge signal during an overlap period when a driving period is at least partially overlapped with a discharge period. The controller orders the signal generator to generate the second discharge signal when the driving period is not overlapping with the discharge period.

5 Claims, 6 Drawing Sheets

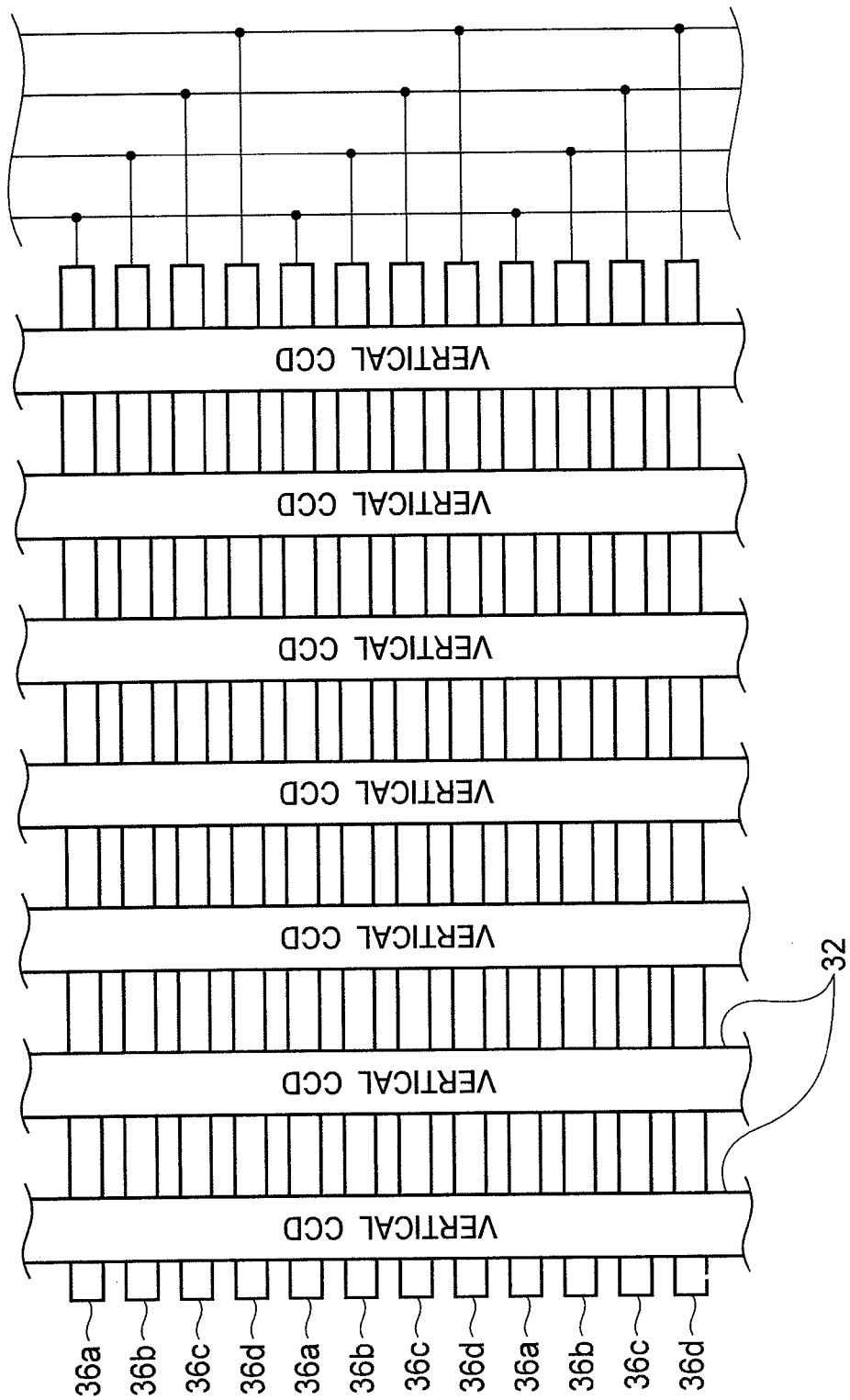

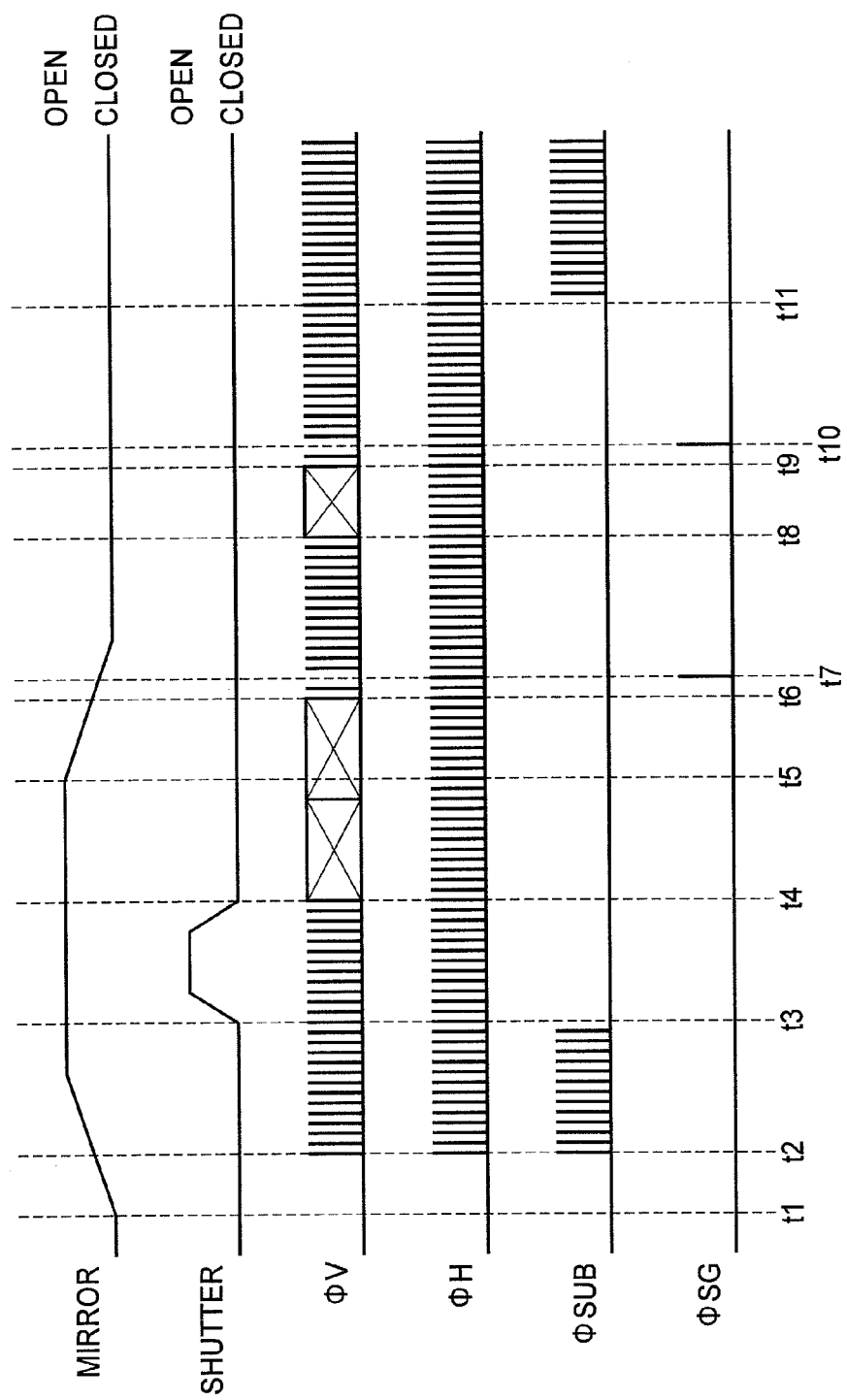

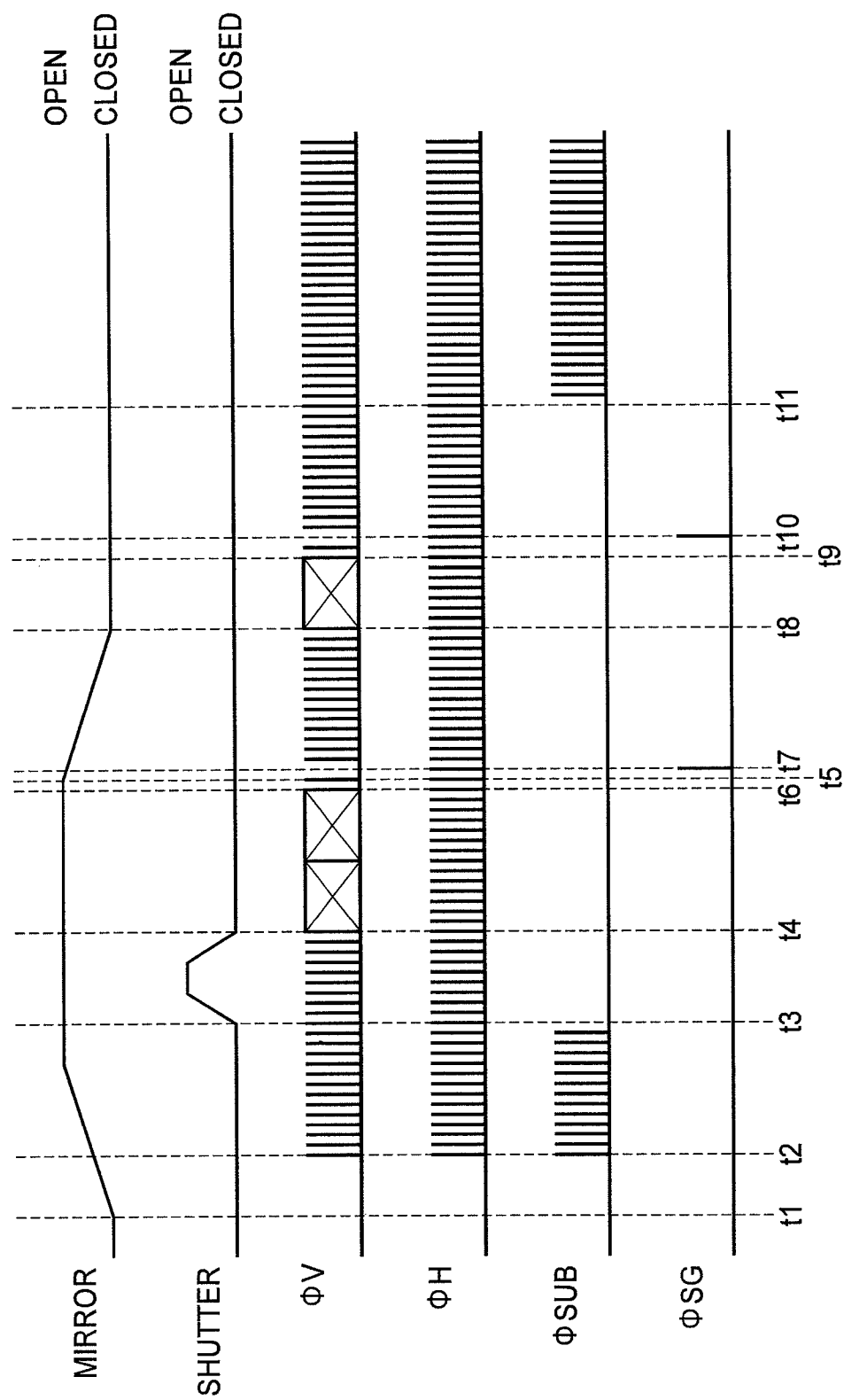

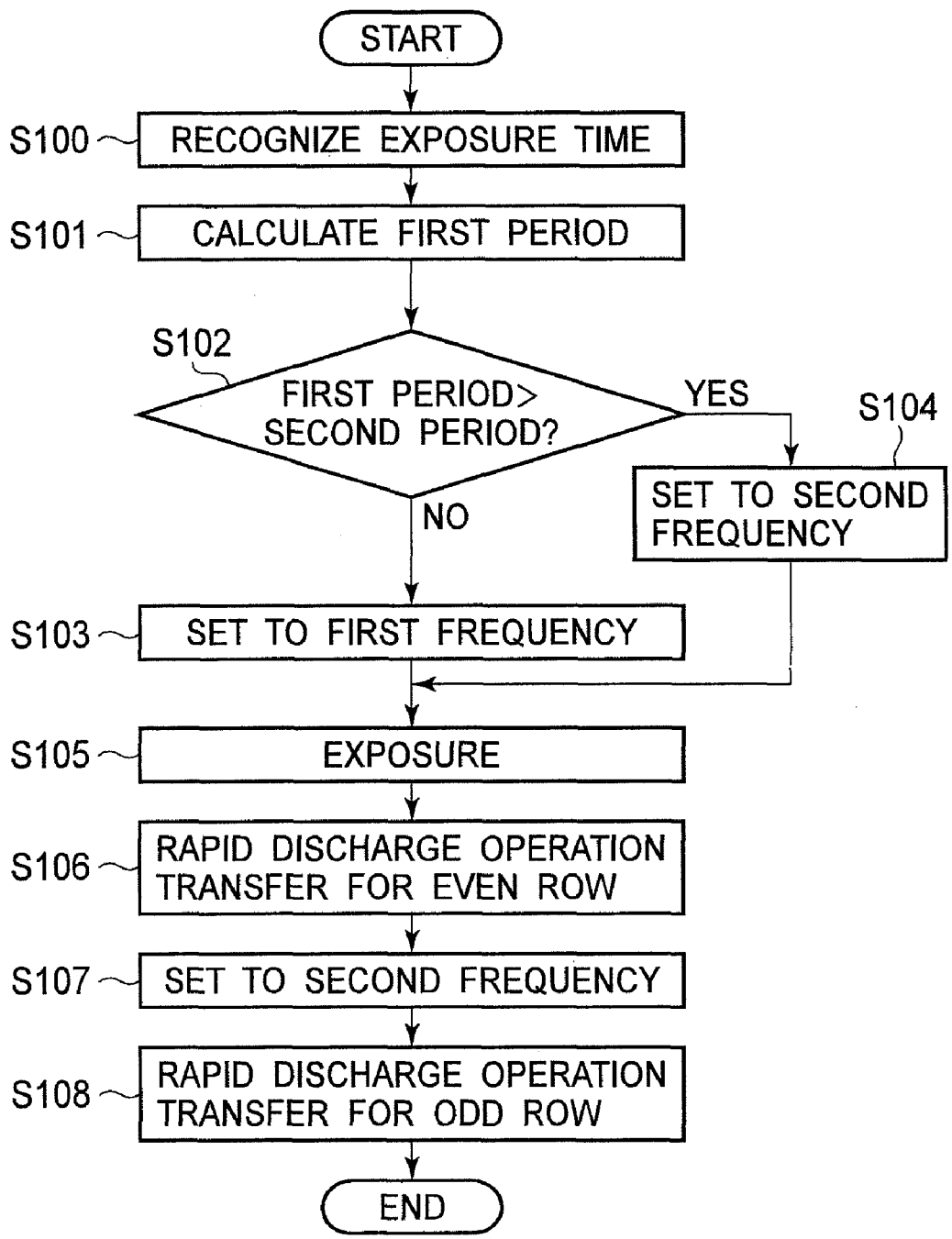

IMAGE SENSOR DRIVING UNIT AND CAMERA

BACKGROUND OF THE INVENTION

1. Field of the Invention

The present invention relates to an image sensor driving unit that orders an image sensor to rapidly discharge an unnecessary electrical charge generated by a charge-transfer channel, such as a CCD, before a photographing operation.

2. Description of the Related Art

Various kinds of image sensors that generate an image signal corresponding to an optical image of a subject are known. Among the various kinds of image sensors, a CCD image sensor, which is improved with respect to size, S/N ratio, sensitivity and other aspects, is broadly used.

A CCD image sensor outputs pixel signals according to the amount of light received by the pixels by ordering a vertical CCD to receive signal charges generated by a plurality of pixels separately, by ordering the vertical CCD to transfer the signal charges to a horizontal CCD, and by ordering the horizontal CCD to transfer the signal charges to an output amplifier.

The vertical CCD happens to store the electrical charge that the vertical CCD generates itself when light is leaked to the vertical CCD, and from an electrical charge left upon transferring an electrical charge exceeding the transferring capacity, from an electrical charge leaked from a pixel, and so on. Such an electrical charge becomes noise in a signal charge, and should be discharged to display an accurate image.

Japanese Unexamined Patent Publication No. H04-356879 discloses the rapid discharge of electrical charges that remain in the vertical CCD before the vertical CCD receives and transfers signal charges from pixels.

Generally, it is desired that the period for the completion of a photographing operation is short.

SUMMARY OF THE INVENTION

Therefore, an object of the present invention is to provide an image sensor driving unit that both shortens the time it takes to complete a photographing operation by discharging an electrical charge stored in a charge-transfer channel, such as a CCD, and prevents the photographing operation from suspending due to a power shortage.

According to the present invention, an image sensor driving unit, comprising a signal generator and a controller, is provided. The image sensor driving unit drives an image sensor. The image sensor has a plurality of pixels and a charge-transfer channel. The pixels generate signal charges according to amounts of received light. The charge-transfer channel reads out the signal charges from the pixels. The charge-transfer channel transfers the signal charges at a speed according to the frequency of a transfer signal. The signal generator generates a normal transfer signal, a first discharge signal and a second discharge signal. The signal generator transmits the normal transfer signal, the first discharge signal, and the second discharge signal to the image sensor. The normal transfer signal is the transfer signal for transferring the signal charges. The first and second discharge signals are the transfer signals for the charge-transfer channel to carry out rapid discharge. The frequency of the first discharge signal is greater than that of the normal transfer signal. The frequency of the second discharge signal is greater than that of the first discharge signal. Electrical charges remaining in the charge-transfer channel are rapidly discharged by the rapid discharge. The controller orders the signal generator to generate the first discharge signal during an overlap period when a driving period is at least partially overlapped with a discharge period. A first object is driven during the driving period. The rapid discharge is carried out during the discharge period. Power supplied by a common power source is used for driving the first object and carrying out the rapid discharge. The overlap period is overlapping portions of the driving period and the discharge period. The controller orders the signal generator to generate the second discharge signal when the driving period is not overlapping with the discharge period.

According to the present invention, an image sensor driving unit, comprising a signal generator and a controller, is provided. The image sensor driving unit drives an image sensor. The image sensor has a plurality of pixels and a charge-transfer channel. The pixels generate signal charges according to amounts of received light. The charge-transfer channel reads out the signal charges from the pixels. The charge-transfer channel transfers the signal charges at a speed according to the frequency of a transfer signal. The signal generator generates a normal transfer signal, a first discharge signal and a second discharge signal. The signal generator transmits the normal transfer signal, the first discharge signal, and the second discharge signal to the image sensor. The normal transfer signal is the transfer signal for transferring the signal charges. The first and second discharge signals are the transfer signals for the charge-transfer channel to carry out rapid discharge. The frequency of the first discharge signal is greater than that of the normal transfer signal. The frequency of the second discharge signal is greater than that of the first discharge signal. Electrical charges remaining in the charge-transfer channel are rapidly discharged by the rapid discharge. The controller orders the signal generator to generate one of the first and second discharge signals before transferring the signal charges from the pixels via the charge-transfer channel during a first field period. The controller orders the signal generator to generate the second discharge signal before transferring the signal charges from the pixels via the charge-transfer channel during a second field period. The signal charges generated at the same time are transferred separately during the first and second field periods in order.

According to the present invention, a camera, comprising an image sensor, a first object, a signal generator and a controller, is provided. The image sensor has a plurality of pixels and a charge-transfer channel. The pixels generate signal charges according to amounts of received light, the charge-transfer channel reading out the signal charges from the pixels. The charge-transfer channel transfers the signal charges at a speed according to a frequency of a transferring signal. The first object is driven during a driving period. Power supplied by a power source is used for driving the first object. The signal generator generates a normal transfer signal a first discharge signal and a second discharge signal. The signal generator transmits the normal transfer signal the first discharge signal, and the second discharge signal to the image sensor. The normal transfer signal is the transfer signal for transferring the signal charges. The first and second discharge signals are the transfer signals for the charge-transfer channel to carry out rapid discharge. The frequency of the first discharge signal is greater than that of the normal transfer signal. The frequency of the second discharge signal is greater than that of the first discharge signal. Electrical charges remaining in the charge-transfer channel are rapidly discharged by the rapid discharge. The controller orders the signal generator to generate the first discharge signal during an overlap period when the driving period is at least partially overlapped with a discharge period. The rapid discharge is carried out during the discharge period. Power supplied by the power source is used for carrying out the rapid discharge. The overlap period is overlapping portions of the driving period and the discharge period. The controller orders the signal generator to generate the second discharge signal when the driving period is not overlapping with the discharge period.

BRIEF DESCRIPTION OF THE DRAWINGS

The objects and advantages of the present invention will be better understood from the following description, with reference to the accompanying drawings in which:

FIG. 3 is a deployment diagram showing the first-fourth electrodes;

FIG. 4 is a timing chart illustrating the release operation for the case when the exposure time is set to a longer time;

FIG. 5 is a timing chart illustrating the release operation for the case when the exposure time is set to a shorter time; and FIG. 6 is a flowchart illustrating the process for the release control carried out by the CPU.

DESCRIPTION OF THE PREFERRED EMBODIMENTS

Figure 1:
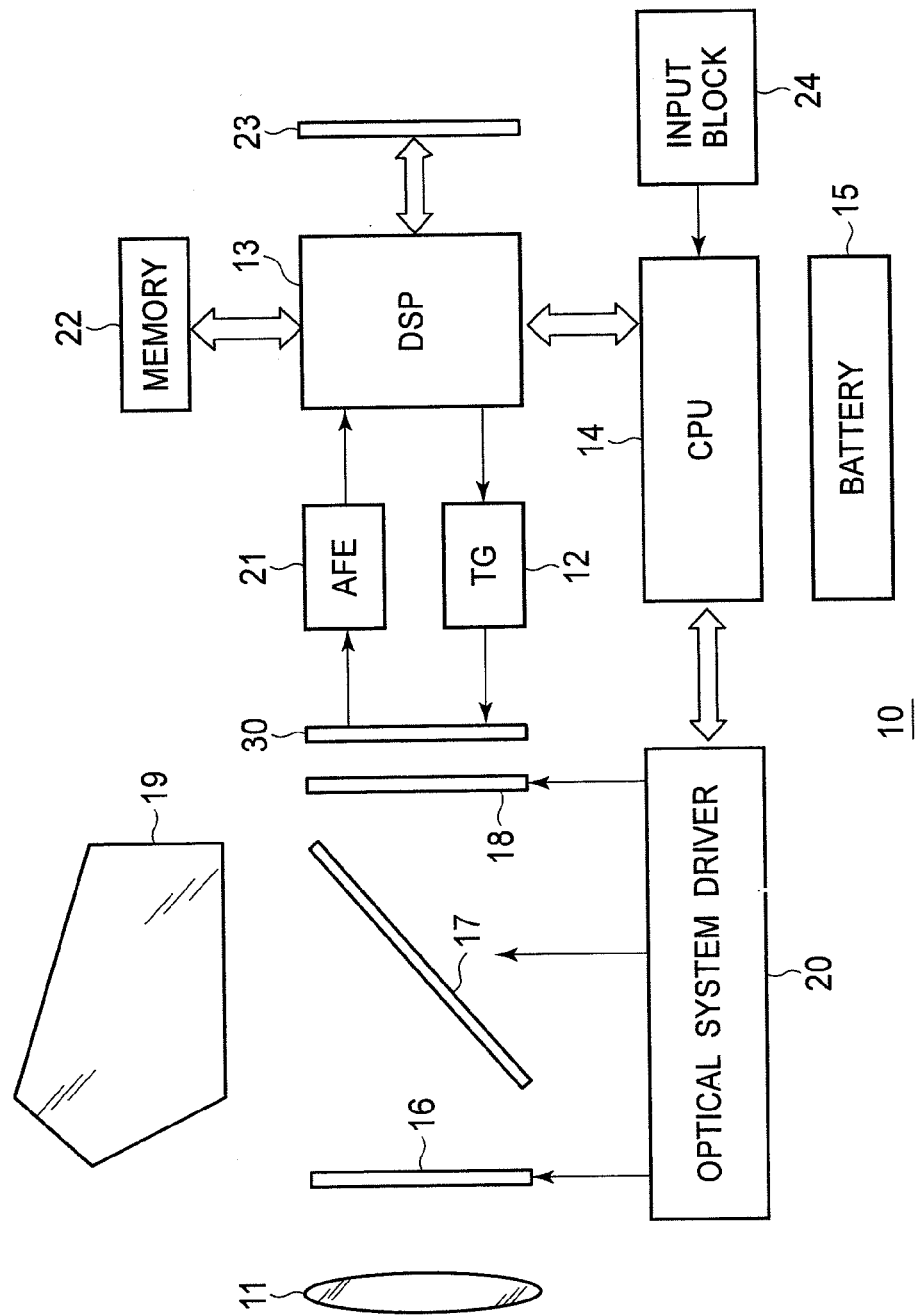
FIG. 1 is a block diagram showing the internal structure of a single-lens reflex camera having the image sensor driving unit of the embodiments of the present invention.

The present invention is described below with reference to the embodiment shown in the drawings.

In FIG. 1, the single-lens reflex camera 10 comprises a photographic optical system 11, an image sensor 30, a timing generator (TG) 12 (signal generator), a digital signal processor (DSP) 13, a CPU 14, a battery 15, and other components.

The photographic optical system 11 comprises a plurality of lenses, including a focus lens (not depicted) and a zoom lens (not depicted). The image sensor 30 is arranged on the optical axis of the photographic optical system 11 so that the light-receiving surface of the image sensor 30 is perpendicular to the optical axis. The photographic optical system 11 enables an optical image of a subject to be in focus on the light-receiving surface.

A diaphragm 16, a mirror 17 (first object), and a shutter 18 are positioned between the photographic optical system 11 and the image sensor 30. By varying the size of the aperture of the diaphragm 16, the amount of light incident on the image sensor 30 may be adjusted. In ready mode for photographing, the mirror 17 intersects the optical axis, and an optical image is reflected by the mirror 17 to a pentaprism 19 and transmitted to a viewfinder (not depicted). Upon a release operation, the mirror 17 is turned upward, and the optical image arrives at the shutter 18. By opening and closing the shutter, light arriving at the image sensor 30 may be controlled.

The diaphragm 16, the mirror 17, and the shutter 18 are driven by the optical system driver 20. The optical system driver 20 drives each of the components on the basis of the control of the CPU 14.

The single-lens reflex camera comprises a photometric sensor (not depicted). The photometric sensor measures the amount of light in a peripheral area around the subject. The size of the aperture of the diaphragm 16, the points in time when the mirror 17 is turned upward and downward, and the conditions of exposure, such as the exposure time, are adjusted on the basis of the measured amount of the light.

The TG 12 drives the image sensor 30 to generate an image signal corresponding to the optical image reaching the light-receiving surface. The TG 12 is controlled by the DSP 13. The generated image signal is transmitted to the DSP 13 via an AFE 21.

The AFE 21 carries out correlated double sampling processing, auto gain control processing, and analog-to-digital conversion processing on the received image signal. The DSP 13 carries out predetermined signal processing on the received image signal. The image signal, having undergone predetermined signal processing, is stored in a memory 22 or transmitted to an LCD 23, where a captured image is displayed.

The DSP 13 is connected to the CPU 14. The DSP 13 drives the TG 12, carries out predetermined signal processing on the image signal, stores the image signal in the memory 22, and conducts other operations on the basis of orders from the CPU 14.

As described above, the CPU 14 controls the optical system driver 20 and the DSP 13. In addition, the CPU 14 controls the operations of each component of the single-lens reflex camera 10. The CPU 14 is connected to an input block 24 that comprises a release button (not depicted), a power button (not depicted), a multifunctional cross key (not depicted), and so on. The CPU 14 controls the components according to various commands input by a user to the input block 24.

As described above, the CPU 14 adjusts the size of the aperture and the exposure time on the basis of the measured amount of light. However, a user can adjust the conditions of exposure by inputting a command to the input block 24.

The battery 15 supplies each component of the single-lens reflex camera 10 with power. For example, the power supplied by the battery 15 is used for driving the diaphragm 16, the mirror 17, the shutter 18, the image sensor 30, the DSP 13, and the CPU 14.

Next, the operation of the image sensor 30 upon the release operation, and the structure of the image sensor 30 are explained.

Figure 2:
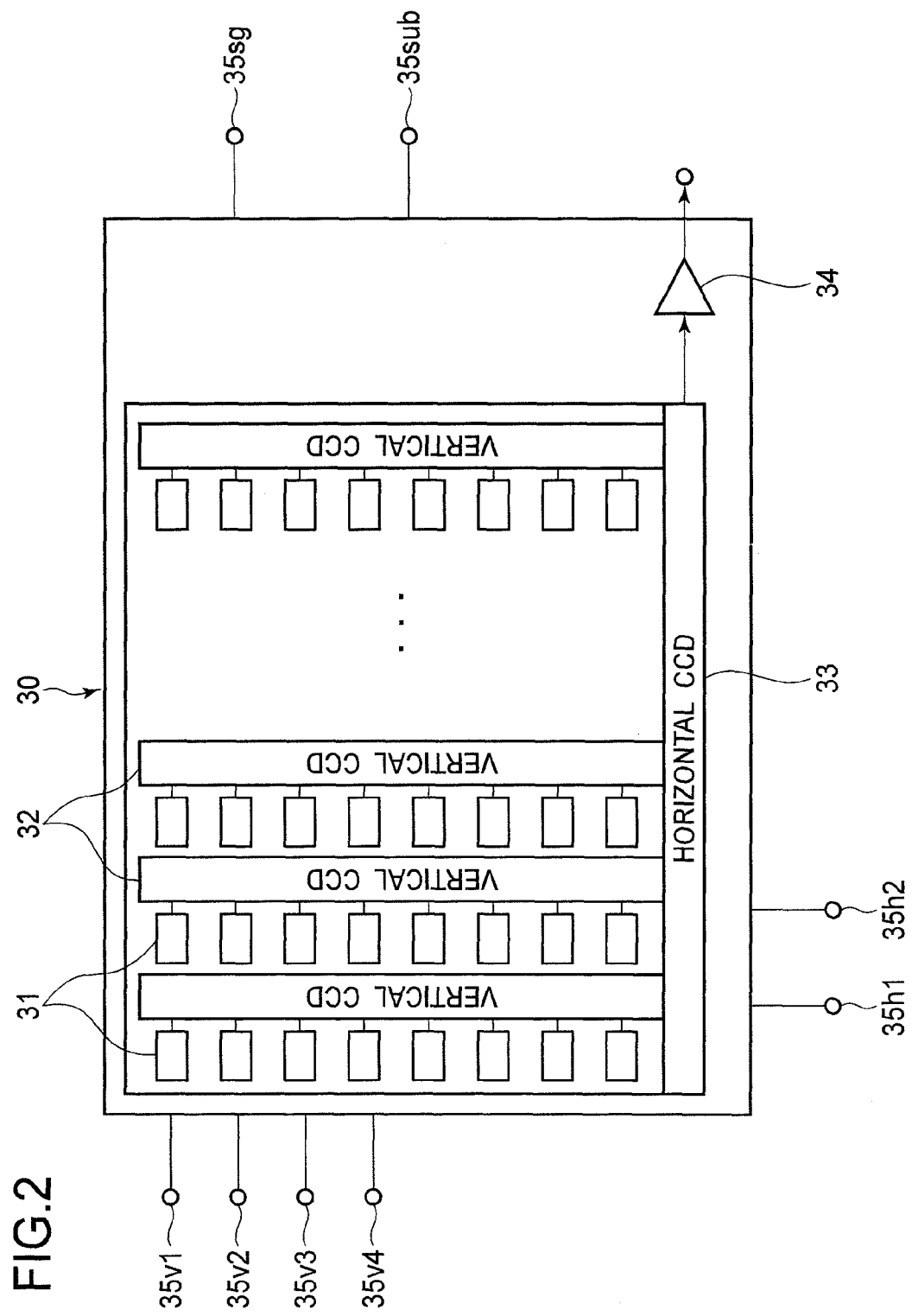
FIG. 2 is a schematic diagram showing the structure of the image sensor.

The image sensor 30 is a CCD image sensor. As shown in FIG. 2, the image sensor 30 comprises pixels 31, vertical CCDs 32 (charge-transfer channel), a horizontal CCD 33, an output amplifier 34, and other components.

A plurality of pixels 31 are arranged on the light-receiving surface in two dimensions. The vertical CCDs 32 are arranged in each column of the arranged pixels 31. All the pixels 31 are connected to their respective adjacent vertical CCD 32. The horizontal CCD 33 is arranged at the lower end of the vertical CCDs 32. All the vertical CCDs 32 are connected to the horizontal CCD 33. One end of the horizontal CCD 33 is connected to the output amplifier 34.

Each pixel 31 generates and accumulates a signal charge corresponding to the amount of light received. A substrate (not depicted) where the pixels 31 are arranged is connected to an electronic shutter terminal 35sub. When an electronic shutter pulse, hereinafter referred to as ΦSUB, is input to the electronic shutter terminal 35sub, an accumulated electrical charge is discharged from all the pixels 31. In addition, a sensor gate (not depicted) is arranged between the pixels 31 and the vertical CCDs 32. The sensor gate comprises a sensor gate terminal 35sg, hereinafter referred to as SG terminal. When an SG pulse, hereinafter referred to as ΦSG, is input to the SG terminal 35sg, the accumulated signal charge in each pixel is output to the vertical CCDs 32.

As shown in FIG. 3, first, second, third, and fourth electrodes 36a, 36b, 36c, and 36d are arranged repeatedly in order along the column direction of the vertical CCDs 32. In addition, the first, second, third, and fourth electrodes 36a, 36b, 36c, and 36d are connected to first, second, third, and fourth vertical transfer terminals 35v1, 35v2, 35v3, and 35v4 (see FIG. 2), respectively. By inputting vertical transfer pulses (transfer signal), hereinafter referred to as ΦV, to the first through fourth electrodes 36a-36d while shifting their phases, the electrical charge stored in the vertical CCDs 32 is transferred to the horizontal CCD 33.

The speed at which the vertical CCDs 32 transfer an electrical charge varies in proportion to the frequency of ΦV. The transfer speed increases as the frequency is increased. On the other hand, the transfer speed decreases as the frequency is decreased.

The fifth and sixth electrodes (not depicted) are arranged repeatedly in order along the row direction of the horizontal CCD 33. In addition, the fifth and sixth electrodes are connected to first and second horizontal transfer terminals 35h1 and 35h2 (see FIG. 2), respectively. By inputting horizontal transfer pulses, hereinafter referred to as ΦH, to the fifth and sixth electrodes while shifting their phase, the electronic charge received by the horizontal CCD 33 is transferred to the output amplifier 34.

ΦSUB, ΦSG, ΦV, and ΦH are generated by the TG 12 and input to their respective terminals.

The output amplifier 34 comprises a capacitor (not depicted) that converts a received signal charge into a signal voltage, and outputs the converted signal voltage.

Next, the release control, which commences when the release button is fully depressed, is explained using FIGS. 4 and 5.

The CPU 14 commences the release control, which is a sequential control, when the fully depressed release button is detected.

At time t1 after detection of full depression of the release button, the mirror 17 is turned upward.

At time t2 following time t1, the inputs of ΦV, ΦH and ΦSUB commence. Specifically, ΦV is input with a frequency set for transferring signal charges to the first to fourth vertical transfer terminals 35v1-35v4, ΦH is input to the first and second horizontal transfer terminals 35h1 and 35h2, and ΦSUB is input to the electrical shutter terminal 35sub. Then, electrical charges remaining in the vertical CCDs 32, the horizontal CCD 33, and the pixels 31 are discharged.

At time t3, the input of ΦSUB is suspended and all the pixels 31 become capable of accumulating signal charges. In addition, at time t3, the shutter 18 is opened and the exposure of an optical image to the image sensor 30 commences. At time t4, after a set exposure time has elapsed, the shutter 18 is closed and the exposure is completed.

The image sensor 30 is driven with an interlace scan. And the signal charges generated in one exposure are read out in two separate field periods, which are an even field period and an odd field period. During the even field period, the signal charges generated by the pixels 31 arranged in the even rows are read out from the image sensor 30. During the odd field period, which follows the even field period, the signal charges generated by the pixels 31 arranged in the odd rows are read out from the image sensor 30.

Before reading out the signal charges during the even field period, the rapid discharge from the vertical CCDs 32 is carried out. At time t4 coincident with the completion of the exposure, the frequency of ΦV is changed to a frequency for rapid discharge that is greater than the frequency for transmitting the electrical charges. The electrical charges stored in the vertical CCDs 32 are then rapidly discharged.

An electrical charge can be stored in any location of the vertical CCDs 32. A single rapid discharge operation is carried out by transferring the electrical charges stored in each location to the horizontal CCD 33, in order from the nearest to the farthest locations from the horizontal CCD 33. Before reading out the signal charges during the even field period, two rapid discharge operations are carried out.

First and second frequencies are predetermined for the rapid discharge operation. The second frequency is greater than the first frequency. As explained below, when the electrical charges are required to be discharged, the frequency of ΦV is set to the first or second frequency based on the timing of turning the mirror 17 downward and the exposure time.

The electrical charges are rapidly discharged at first and second transfer speeds when the frequency of ΦV is set to the first and second frequency, respectively. Because the second frequency is greater than the first frequency, the second transfer speed is greater than the first transfer speed.

As described above, the CPU 14 sets the exposure time and the points in time when the mirror 17 turns upward and downward on the basis of the measured amount of the light in a peripheral area around the subject. After setting the exposure time and the mirror-turning times, a first period is calculated. The first period is from the end of the time of exposure to the beginning of the turning of the mirror 17 downward.

The calculated first period is compared with a second period that is determined by the time it takes to carry out two rapid discharges at the second transfer speed.

When the second period is longer than the first period, the frequency of ΦV is set to the first frequency. In other words, if the rapid discharge operation at the second transfer speed cannot be completed twice during the period from the completion of the exposure (time t4) to the point in time when the mirror 17 begins turning downward, the frequency of ΦV is set to the first frequency. By setting the frequency of ΦV to the first frequency, the rapid discharge operation is carried out at the first transfer speed (see FIG. 4).

On the other hand, when the second period is shorter than the first period, the frequency of ΦV is set to the second frequency. In other words, if the rapid discharge operation at the second transfer speed can be completed twice during the period from the completion of the exposure (time t4) to the point in time when the mirror 17 begins turning downward, the frequency of ΦV is set to the second frequency. By setting the frequency of ΦV to the second frequency, the rapid discharge operation at the second transfer speed is carried out and completed in less time than required for the rapid discharge operation at the first speed (see FIG. 5).

At time t6 when the second rapid discharge operation is completed, the frequency of ΦV is changed to the frequency for transferring signal charges. By changing the frequency of ΦV to the frequency for transferring signal charges, signal charges can be transferred to the horizontal CCD 33 without transfer error.

After completion of the rapid discharge operation from the vertical CCDs 32, ΦSG is input to the sensor gate terminal 35sg (see time t7). In addition, ΦV, which is adjusted so that the vertical CCDs 32 read out the signal charges accumulated in the pixels arranged in the even rows, is input to the first through fourth vertical transfer terminals 35v1-35v4. By inputting ΦSG and ΦV described above, the signal charges generated by and accumulated in the pixels 31 of the even rows during the period from time t3 to time t4 are read out by the vertical CCDs 32.

When the transfer of the signal charges in all the pixels 31 in the even rows by the vertical CCDs 32 and the horizontal CCD 33 is completed, reading out from the even field finishes (see time t8).

After finishing the reading out from the even field (see time t8), the frequency of ΦV is changed to the second frequency, and electrical charges stored in the vertical CCDs 32 are rapidly discharged at the second transfer speed (see the period from time t8 to time t9). The frequency of ΦV is not set to the first frequency because the mirror 17 is not turned in the rapid discharge operation this time, unlike the discharge operation carried out before reading from the even field.

In addition, unlike the discharge operation carried out before reading the signal charges from the even field, only a single rapid discharge operation is carried out before reading out the signal charges from the odd field. At time t9, when the single rapid discharge operation is completed, the frequency of ΦV is changed to the frequency for transferring signal charges.

After completion of the rapid discharge from the vertical CCDs 32, ΦSG is input to the sensor gate terminal 35sg (see time t10). In addition, ΦV, which is adjusted so that the vertical CCDs 32 read out the signal charges accumulated in the pixels arranged in the odd rows, is input to the first-fourth vertical transfer terminals 35v1 through 35v4. By inputting ΦSG and ΦV as described above, the signal charges generated by and accumulated in the pixels 31 of the odd rows during the period from time t3 to time t4 are read out by the vertical CCDs 32.

When the transfer of the signal charges in all the pixels 31 in the odd rows by the vertical CCDs 32 and the horizontal CCD 33 is completed, reading out from the odd field finishes (see time t11). Then, by generating and reading out one frame of an image signal, one capture of an image is completed. After completing the capture of an image, electrical charges accumulated by the pixels 31 are discharged until the next single release control is started by inputting ΦSUB to the electrical shutter terminal 35sub again.

Next, the release control carried out by the CPU 14 is explained below using the flowchart of FIG. 6. The release control commences when the CPU 14 detects the fully depressed release button.

At step S100, the CPU 14 recognizes the exposure time set by a user's direct command or according to the measured amount of light in a peripheral area around the subject. After recognizing the exposure time, the process proceeds to step S101.

At step S101, the CPU 14 calculates the first period, which is from the time of the completion of the exposure to the point in time when mirror 17 begins turning downward. After calculation of the first period, the process proceeds to step S102.

At step S102, the CPU determines whether or not the first period is longer than the second period. When the first period is shorter than or equal to the second period, the process proceeds to step S103. On the other hand, when the first period is longer than the second period, the process proceeds to step S104.

At step S103, the CPU 14 sets the frequency of ΦV for the rapid discharge operation to the first frequency. On the other hand, at step S104, the CPU 14 sets the frequency of ΦV for the rapid discharge operation to the second frequency. After setting the frequency of ΦV for the rapid discharge operation, the process proceeds to step S105.

At step S105, the CPU 14 orders the optical system driver 20 to commence exposure. The exposure is completed by turning the mirror 17 upward and opening the shutter 18 for the duration of the set exposure time. After completion of exposure, the process proceeds to step S106.

At step S106, the CPU 14 orders the TG 12 to carry out two rapid discharge operations from the vertical CCDs 32. In addition, the rapid discharge operations are carried out at the transfer speed according to the frequency of ΦV that was set for the rapid discharge operation in step S103 or S104. After the rapid discharge operations, the CPU 14 orders the vertical CCDs 32 to transfer the signal charges of the pixels 31 in even rows. After completion of transferring the signal charges from all the pixels in the even rows, the process proceeds to step S107.

At step S107, the CPU 14 sets the frequency of ΦV for the rapid discharge operation to the second frequency, as in step S104. After setting the frequency, the process proceeds to step S108.

At step S108, the CPU 14 orders the TG 12 to carry out the single rapid discharge operation at the second transfer speed. After the rapid discharge operation, the CPU 14 orders the vertical CCDs 32 to transfer the signal charges of the pixels 31 in the odd rows. After completing the transfer of the signal charges from all the pixels in the odd rows, the release control terminates.

In the above embodiment, if the periods for rapid discharging and driving the mirror 17 overlap, either partially or entirely, a normal rapid discharge operation of the first transfer speed is carried out. On the other hand, if the periods of rapid discharging and driving the mirror 17 do not overlap at all, a highly rapid discharge operation of the second transfer speed is carried out. By reducing the time that it takes to rapidly discharge electrical charges from the vertical CCD, the period for the photographing operation can be shortened. In order to shorten the time for rapid discharge, it is necessary to raise the frequency of a driving signal for driving the vertical CCD. On the other hand, raising the frequency of the driving signal will also cause power consumption to rise rapidly. In order to prevent the photographing operation from suspending due to a tentative power shortage, the maximum frequency of the driving signal for driving the vertical CCD is determined so that the maximum frequency corresponds to the power remaining after securing the power required for operations other than the vertical CCD driving operation. Even though the prior art is limited by the maximum frequency of the driving signal, it is required to shorten the time of rapid discharge. Because a normal rapid discharge operation, and not a highly rapid discharge operation, is carried out when a large amount of power is required for driving the mirror 17, it is possible to discharge electrical charges from the vertical CCDs 32 at a highly rapid rate as the photographing operation is prevented from suspending.

The time it takes to complete a single photographing operation is shortened by the highly rapid discharge operation of the vertical CCDs 32. Accordingly, if such control of the transfer speed of rapid discharge is adopted for continuous photographing, the number of photographing operations per a certain time can be increased.

For the rapid discharge operations, if two rapid discharge operations at the second transfer speed cannot be completed during the period from the time of the completion of the exposure to the point in time when the mirror 17 begins turning downward (time t5), the rapid discharge operation is carried out over the entire period at the first transfer speed, in the above embodiment. The same effect can be achieved as long as the rapid discharge operation is carried out so that the periods for rapidly discharging and driving the mirror 17 do not overlap. For example, the rapid discharge operation can be carried out at the second speed until the point in time when the mirror 17 begins turning downward after completion of exposure, then carried out at the first speed from the point in time when the mirror 17 begins turning downward.

The rapid discharge operation is carried out twice before reading the signal charge from the even field and once before reading the signal charge from the odd field in the above embodiment. However, the numbers of the rapid discharge operations are not limited to the above number.

The frequency of ΦV for the rapid discharge operation of the vertical CCDs 32 is set to either one of two predetermined frequencies (i.e., the first or second frequency), in the above embodiment. However, three or more frequencies may be predetermined for the rapid discharge operation, and the frequency of ΦV for the rapid discharge operation can be set to one of the predetermined frequencies.

The decision to carry out either the normal rapid discharge operation or the highly rapid discharge operation is determined by whether or not the period of driving the mirror 17 and the period of the rapid discharge operation either partially or entirely overlap one another in the above embodiment. However, the comparison with the period of the rapid discharge operation is not limited to the period for driving the mirror 17. The same effect as the above embodiment can be achieved by changing the normal and highly rapid discharge operations on the basis of whether or not the period of the rapid discharge operation overlaps with the period for driving another component that is also supplied with power from the same battery 15 that powers the image sensor 30.

Four electrodes 36a-36d are arranged for the vertical CCDs 32 in the above embodiment. However, the number of electrodes for the vertical CCDs 32 is not limited to four. In addition, two electrodes are arranged for the horizontal CCD 33 in the above embodiment. However, the number of electrodes for the horizontal CCD 33 is not limited to two.

All the signal charges are transferred to the output amplifier 34 by twice interlace scanning, in the above embodiment. However, the number for transferring the signal charges is not limited to two, the transfer of the signal charges may be divided by three or more times. Or all the signal charges can be transferred to the output amplifier 34 at once, according to progressive scanning.

The image sensor 30 is a CCD image sensor in the above embodiment. However, other kinds of charge-transfer image sensors can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-266756 (filed on Oct. 15, 2008), which is expressly incorporated herein, by reference, in its entirety.

The invention claimed is:

1. An image sensor driving unit, the image sensor driving unit driving an image sensor, the image sensor having a plurality of pixels and a charge-transfer channel, the pixels generating signal charges according to amounts of received light, the charge-transfer channel reading out the signal charges from the pixels, the charge-transfer channel transferring the signal charges at a speed according to the frequency of a transfer signal, the image sensor driving unit comprising:

a signal generator that generates a normal transfer signal, a first discharge signal and a second discharge signal, the signal generator transmitting the normal transfer signal, the first discharge signal, and the second discharge signal to the image sensor, the normal transfer signal being the transfer signal for transferring the signal charges, the first and second discharge signals being the transfer signals for the charge-transfer channel to carry out rapid discharge, the frequency of the first discharge signal being greater than that of the normal transfer signal, the frequency of the second discharge signal being greater than that of the first discharge signal, electrical charges remaining in the charge-transfer channel being rapidly discharged by the rapid discharge; and a controller that orders the signal generator to generate the first discharge signal during an overlap period when a driving period is at least partially overlapped with a discharge period, a first object being driven during the driving period, the rapid discharge being carried out during the discharge period, power supplied by a common power source being used for driving the first object and carrying out the rapid discharge, the overlap period being overlapping portions of the driving period and the discharge period, the controller ordering the signal generator to generate the second discharge signal when the driving period is not overlapping with the discharge period.

2. An image sensor driving unit according to claim 1, wherein the controller orders the signal generator to generate the first discharge signal during the entire discharge period when the driving period is at least partially overlapping with the discharge period.

3. An image sensor driving unit according to claim 1, wherein the controller orders the signal generator to generate the first discharge signal only during the overlap period when the driving period is at least partially overlapped with the discharge period.

4. An image sensor driving unit, the image sensor driving unit driving an image sensor, the image sensor having a plurality of pixels and a charge-transfer channel, the pixels generating signal charges according to amounts of received light, the charge-transfer channel reading out the signal charges from the pixels, the charge-transfer channel transferring the signal charges at a speed according to the frequency of a transfer signal, the image sensor driving unit comprising:

a signal generator that generates a normal transfer signal, a first discharge signal and a second discharge signal, the signal generator transmitting the normal transfer signal, the first discharge signal, and the second discharge signal to the image sensor, the normal transfer signal being the transfer signal for transferring the signal charges, the first and second discharge signals being the transfer signals for the charge-transfer channel to carry out rapid discharge, the frequency of the first discharge signal being greater than that of the normal transfer signal, the frequency of the second discharge signal being greater than that of the first discharge signal, electrical charges remaining in the charge-transfer channel being rapidly discharged by the rapid discharge; and a controller that orders the signal generator to generate one of the first and second discharge signals before transferring the signal charges from the pixels via the charge-transfer channel during a first field period, the controller ordering the signal generator to generate the second discharge signal before transferring the signal charges from the pixels via the charge-transfer channel during a second field period, the signal charges generated at the same time being transferred separately during the first and second field periods in order.

5. A camera comprising:

an image sensor that has a plurality of pixels and a charge-transfer channel, the pixels generating signal charges according to amounts of received light, the charge-transfer channel reading out the signal charges from the pixels, the charge-transfer channel transferring the signal charges at a speed according to a frequency of a transferring signal;

a first object that is driven during a driving period, power supplied by a power source being used for driving the first object;

a signal generator that generates a normal transfer signal, a first discharge signal and a second discharge signal, the signal generator transmitting the normal transfer signal, the first discharge signal, and the second discharge signal to the image sensor, the normal transfer signal being the transfer signal for transferring the signal charges, the first and second discharge signals being the transfer signals for the charge-transfer channel to carry out rapid discharge, the frequency of the first discharge signal being greater than that of the normal transfer signal, the frequency of the second discharge signal being greater than that of the first discharge signal, electrical charges remaining in the charge-transfer channel being rapidly discharged by the rapid discharge; and a controller that orders the signal generator to generate the first discharge signal during an overlap period when the driving period is at least partially overlapped with a discharge period, the rapid discharge being carried out during the discharge period, power supplied by the power source being used for carrying out the rapid discharge, the overlap period being overlapping portions of the driving period and the discharge period, the controller ordering the signal generator to generate the second discharge signal when the driving period is not overlapping with the discharge period.

\* \* \* \* \*